US009228652B2

United States Patent
Nishikawa

(10) Patent No.: US 9,228,652 B2
(45) Date of Patent: Jan. 5, 2016

(54) BICYCLE DRIVE UNIT

(71) Applicant: Shimano Inc., Sakai, Osaka (JP)

(72) Inventor: Yusuke Nishikawa, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/228,201

(22) Filed: Mar. 27, 2014

(65) Prior Publication Data

US 2015/0276042 A1 Oct. 1, 2015

(51) Int. Cl.
| | |
|---|---|
| *B62M 6/55* | (2010.01) |
| *F16H 57/04* | (2010.01) |
| *B62M 1/36* | (2013.01) |

(52) U.S. Cl.
CPC ............. *F16H 57/0416* (2013.01); *B62M 1/36* (2013.01); *B62M 6/55* (2013.01)

(58) Field of Classification Search
CPC ............ B62M 6/55; B62M 6/40; B62M 6/80; B62M 1/36; F16H 57/0416
USPC .................................. 180/206.1, 206.4, 207.1
See application file for complete search history.

(56) References Cited

U.S. PATENT DOCUMENTS

| | | | | |
|---|---|---|---|---|
| 5,450,915 | A * | 9/1995 | Li .............................. | 180/65.51 |
| 5,845,727 | A * | 12/1998 | Miyazawa et al. ......... | 180/206.4 |
| 6,100,615 | A * | 8/2000 | Birkestrand ............. | 310/75 C |
| 6,119,801 | A * | 9/2000 | Yamashita et al. ......... | 180/205.5 |
| 6,278,216 | B1 * | 8/2001 | Li ................................ | 310/424 |
| 6,296,072 | B1 * | 10/2001 | Turner ......................... | 180/220 |
| 7,059,437 | B2 * | 6/2006 | Heinen ...................... | 180/65.51 |
| 7,347,427 | B2 * | 3/2008 | Heinen ...................... | 280/5.514 |
| 8,205,705 | B2 * | 6/2012 | Li et al. ..................... | 180/206.4 |
| 8,590,655 | B2 * | 11/2013 | Chan ......................... | 180/206.4 |
| 8,721,481 | B2 * | 5/2014 | Chan ................................ | 475/4 |
| 2005/0029033 | A1 * | 2/2005 | Rip et al. ..................... | 180/220 |
| 2013/0095971 | A1 * | 4/2013 | Hino et al. ........................ | 475/5 |

FOREIGN PATENT DOCUMENTS

JP 4830485 B2 9/2011

* cited by examiner

*Primary Examiner* — Joseph Rocca
*Assistant Examiner* — Michael Stabley
(74) *Attorney, Agent, or Firm* — Global IP Counselors

(57) ABSTRACT

A bicycle drive unit includes a housing, a motor, a crank axle, and at least one fin member. The motor is disposed within the housing. The crank axle is rotatably supported relative to the housing about a first rotational axis. The fin member is rotatably arranged relative to the housing. The fin member is operatively coupled to the crank axle to rotate and to generate an air flow within the housing in response to rotation of the crank axle.

16 Claims, 3 Drawing Sheets

BICYCLE DRIVE UNIT

BACKGROUND

1. Field of the Invention

This invention generally relates to a bicycle drive unit. More specifically, the present invention relates to a bicycle drive unit having a motor.

2. Background Information

Conventionally, an electrically assisted bicycle is well-known in the art that uses a drive force of a motor as assisting power. Specifically, the electrically assisted bicycle has a bicycle drive unit to which a pedaling force is inputted by the pedals. The bicycle drive unit has the motor that generates the drive force according to the pedaling force. The motor is disposed within a housing of the bicycle drive unit. With this bicycle drive unit, the pedaling force of the pedals and the drive force of the motor are combined together, and then the combined drive force is outputted to rotate the rear wheel.

SUMMARY

Generally, the present disclosure is directed to various features of the bicycle drive unit having the motor. The motor generally generates heat inside the housing while the motor is working. Since the motor is accommodated within the housing, the heat generated by the motor increases temperature inside the housing.

One aspect is to provide a bicycle drive unit with which a motor can be properly cooled inside a housing.

In view of the state of the known technology and in accordance with a first aspect of the present invention, a bicycle drive unit is provided that includes a housing, a motor, a crank axle, and at least one fin member. The motor is disposed within the housing. The crank axle is rotatably supported relative to the housing about a first rotational axis. The fin member is rotatably arranged relative to the housing. The fin member is operatively coupled to the crank axle to rotate and to generate an air flow within the housing in response to rotation of the crank axle.

In accordance with a second aspect of the present invention, the bicycle drive unit according to the first aspect further includes a transmission mechanism including a plurality of selectable gear ratios. The transmission mechanism is disposed within the housing. The transmission mechanism is operatively coupled to the crank axle.

In accordance with a third aspect of the present invention, the bicycle drive unit according to the second aspect is configured such that the transmission mechanism has a rotation output member that is rotatable relative to the housing about a second rotational axis in response to the rotation of the crank axle.

In accordance with a fourth aspect of the present invention, the bicycle drive unit according to the third aspect is configured such that the fin member is rotatably arranged relative to the housing about the second rotational axis.

In accordance with a fifth aspect of the present invention, the bicycle drive unit according to the third aspect is configured such that the fin member is disposed on the rotation output member such that the fin member integrally rotates with the rotation output member about the second rotational axis in response to the rotation of the crank axle.

In accordance with a sixth aspect of the present invention, the bicycle drive unit according to the first aspect is configured such that the fin member is disposed radially outward relative to an outermost portion of the motor in a radial direction with respect to the first rotational axis.

In accordance with a seventh aspect of the present invention, the bicycle drive unit according to the first aspect is configured such that the fin member is arranged relative to the motor with an unobstructed passageway between the fin member and the motor such that the air flow generated from the fin member directly reaches the motor via the passageway.

In accordance with an eighth aspect of the present invention, the bicycle drive unit according to the first aspect further includes a motor driver circuit fixedly attached to an inner surface of the housing within the housing.

In accordance with a ninth aspect of the present invention, the bicycle drive unit according to the eighth aspect is configured such that the fin member is arranged relative to the motor driver circuit with an unobstructed passageway between the fin member and the motor driver circuit such that the air flow generated from the fin member directly reaches the motor driver circuit via the passageway.

In accordance with a tenth aspect of the present invention, the bicycle drive unit according to the eighth aspect is configured such that the fin member is located between the motor and the motor driver circuit as viewed in a direction perpendicular to the first rotational axis while the fin member rotates.

In accordance with an eleventh aspect of the present invention, the bicycle drive unit according to the eighth aspect further includes a transmission mechanism having a rotation output member that is rotatable relative to the housing about a second rotational axis in response to the rotation of the crank axle. The transmission mechanism is disposed between the motor and the motor driver circuit in a direction along a plane that is perpendicular to the second rotational axis.

In accordance with a twelfth aspect of the present invention, the bicycle drive unit according to the first aspect is configured such that the housing has a drain opening on a bottom part of the housing.

In accordance with a thirteenth aspect of the present invention, the bicycle drive unit according to the third aspect is configured such that the fin member extends radially outward from an outer periphery of the rotation output member in a radial direction with respect to the second rotational axis.

In accordance with a fourteenth aspect of the present invention, the bicycle drive unit according to the first aspect is configured such that the crank axle is rotatably disposed in a crank axle receiving hole of the motor.

In accordance with a fifteenth aspect of the present invention, the bicycle drive unit according to the third aspect is configured such that the first and second rotational axes are offset from each other.

In accordance with a sixteenth aspect of the present invention, the bicycle drive unit according to the third aspect is configured such that the first and second rotational axes are parallel with respect to each other.

Also other objects, features, aspects and advantages of the present disclosure will become apparent to those skilled in the art from the following detailed description, which, taken in conjunction with the annexed drawings, discloses one embodiment of the bicycle drive unit.

BRIEF DESCRIPTION OF THE DRAWINGS

Referring now to the attached drawings which form a part of this original disclosure.

DETAILED DESCRIPTION OF EMBODIMENTS

A selected embodiment will now be explained with reference to the drawings. It will be apparent to those skilled in the bicycle field from this disclosure that the following descriptions of the embodiment are provided for illustration only and not for the purpose of limiting the invention as defined by the appended claims and their equivalents.

Figure 1:
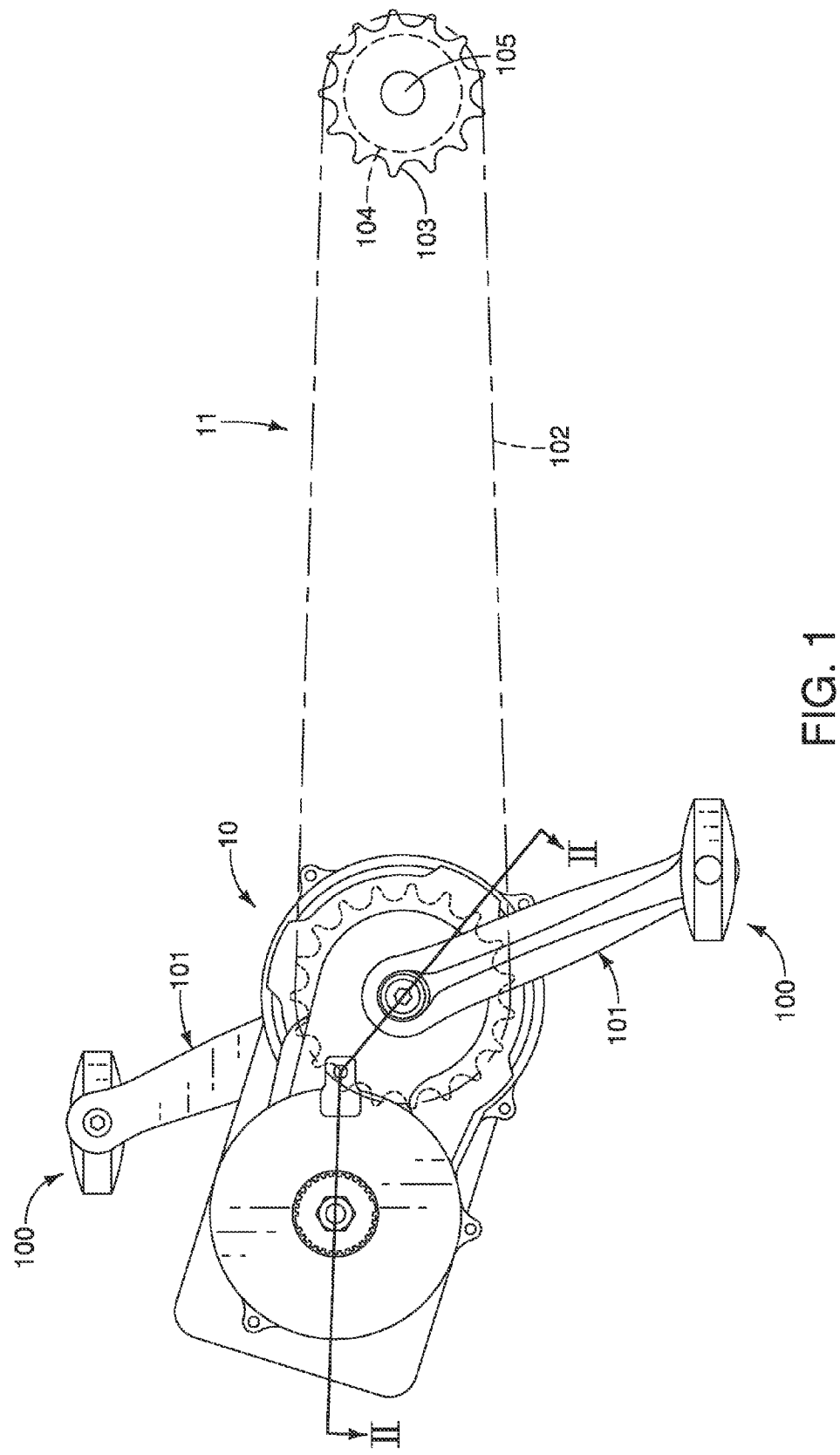
FIG. 1 is a side elevational view of a drive train of an electrically assisted bicycle that is equipped with a drive unit in accordance with one embodiment.
Figure 2:
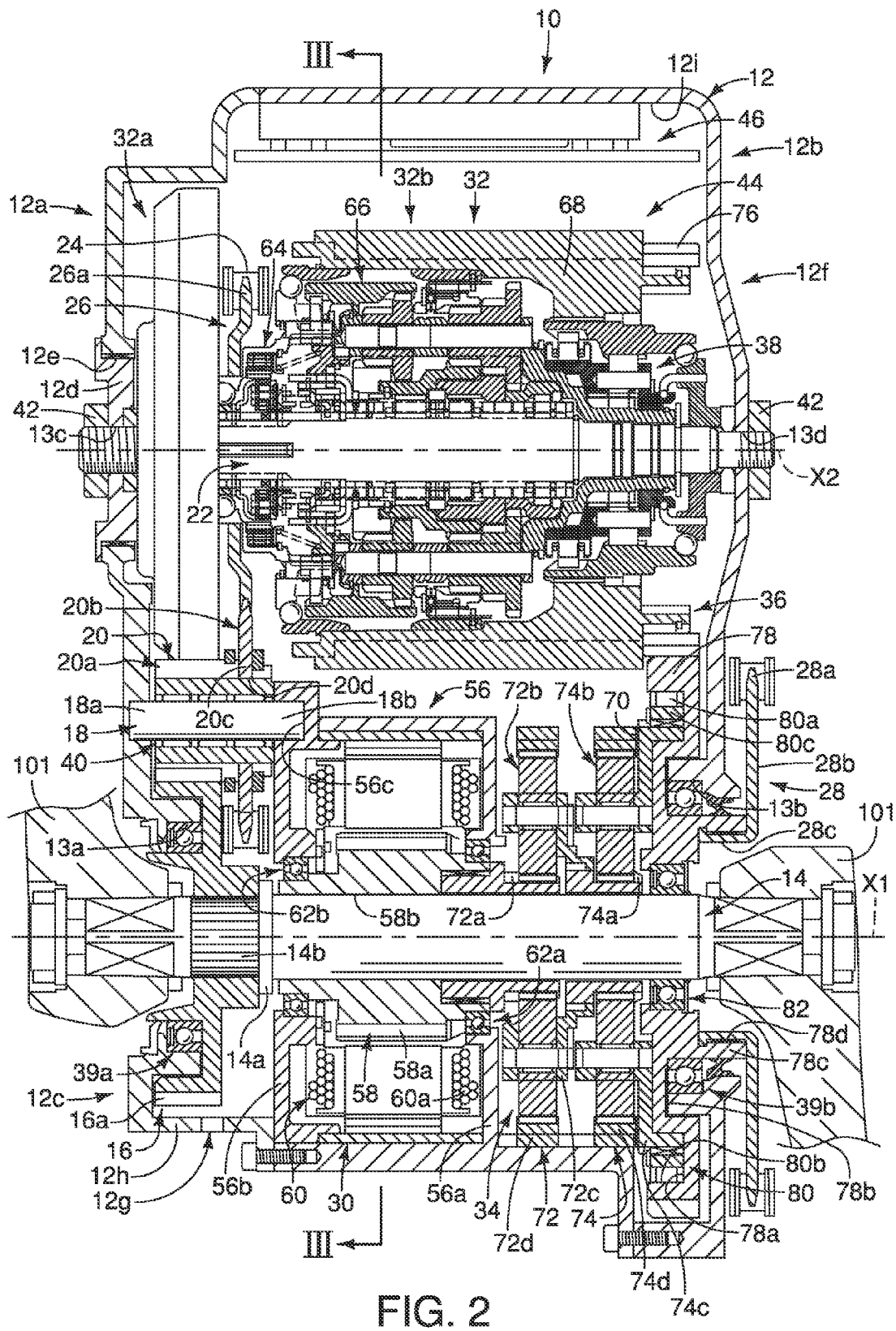
FIG. 2 is a cross-sectional view illustrating the drive unit in accordance with one embodiment, taken along II-II line in FIG. 1.

Referring initially to FIGS. 1 and 2, a drive unit 10 (e.g., a bicycle drive unit) is illustrated in accordance with one embodiment. As illustrated in FIG. 1, the drive unit 10 is disposed on a drive train 11 of an electrically assisted bicycle. In the illustrated embodiment, FIG. 1 only illustrates portions related to the drive train 11 of the electrically assisted bicycle since other portions of the electrically assisted bicycle can be conventional. Thus, detailed description of the electrically assisted bicycle will be omitted for the sake of brevity. As illustrated in FIG. 1, the drive train 11 basically includes a pair of pedals 100, a pair of crank arms 101, the drive unit 10, a first chain 102, a rear sprocket 103 and a rear hub 104. The pedals 100 are rotatably mounted to the free ends of the crank arms 101, respectively. The inner ends of the crank arms 101 are fixed to opposite ends of a crank axle 14 (see FIG. 2) of the drive unit 10, respectively. The first chain 102 is operatively connected between the drive unit 10 and the rear sprocket 103. For the drive train 11 of the electrically assisted bicycle, pedaling force acting on the pedals 100 is transmitted to the rear hub 104 that is rotatably coupled to a rear hub axle 105 to rotate a rear wheel (not shown) of the electrically assisted bicycle via the following transmission passage: the crank arms 101→the drive unit 10→the first chain 102→the rear sprocket 103→the rear hub 104. While transmitting the pedaling force, the drive unit 10 synthesizes a motor output torque as an assisting power for assisting the pedaling force. In the illustrated embodiment, when a pedaling force more than a prescribed threshold is detected, then the motor output torque corresponding to the pedaling force is generated as the assisting power. The drive unit 10 is usually arranged in a vicinity of a connecting section between a seat tube (not shown) of a bicycle frame and a down tube (not shown) of the bicycle frame. A battery for the drive unit 10 is arranged along a rear carrier, the down tube or the seat tube.

As illustrated in FIG. 1, the drive unit 10 is arranged in a vicinity of the crank arms 101. In the illustrated embodiment, as shown in FIG. 2, the drive unit 10 has a housing 12, the crank axle 14, a first rotation transmitting member 16, an intermediate axle 18, a second rotation transmitting member 20, a support axle 22, a second chain 24, a third rotation transmitting member 26 and a front sprocket 28. In the illustrated embodiment, the crank axle 14, the intermediate axle 18 and the support axle 22 are arranged to extend parallel to each other at spaced locations. As shown in FIG. 2, the drive unit 10 has a motor 30, a gear shifting mechanism 32 (e.g., a transmission mechanism), a reduction gear unit 34, a torque combining mechanism 36, and a clutch mechanism 38. Furthermore, the drive unit 10 has a plurality of fin members 44 and a motor drive circuit 46. Thus, the bicycle drive unit 10 (e.g., the bicycle drive unit) includes the housing 12, the motor 30, the crank axle 14, and the fin members 44 (e.g., at least one fin member). Furthermore, the bicycle drive unit 10 includes the gear shifting mechanism 32 (e.g., the transmission mechanism). Also, the bicycle drive unit 10 includes the motor drive circuit 46.

As shown in FIG. 2, the housing 12 accommodates the first rotation transmitting member 16, the second rotation transmitting member 20, the third rotation transmitting member 26, the motor 30, the gear shifting mechanism 32, the reduction gear unit 34, the torque combining mechanism 36, the clutch mechanism 38, the fin members 44 and the motor drive circuit 46. Thus, the motor 30 is disposed within the housing 12. Also, the gear shifting mechanism 32 (e.g., the transmission mechanism) is disposed within the housing 12.

The housing 12 is a member made of, for example, aluminum or another metal. However, a part or the entire of the housing 12 can also be made of a synthetic resin. The housing 12 has a first side wall 12a and a second side wall 12b. The first side wall 12a and the second side wall 12b are independently formed as separate parts, and face with each other in an axial direction of the crank axle 14. The housing 12 has a housing main body containing the second side wall 12b and a lid member containing the first side wall 12a. The lid member is anchored detachably on the opening of the housing main body by bolts or other anchoring members to form an accommodating space for accommodating the first rotation transmitting member 16, the second rotation transmitting member 20, the third rotation transmitting member 26, the motor 30, the gear shifting mechanism 32, the reduction gear unit 34, the torque combining mechanism 36, the clutch mechanism 38, the fin members 44 and the motor drive circuit 46. The first side wall 12a has a first side wall main body 12c and a first plate member 12d. The first plate member 12d is installed detachably and non-rotatably on the first engagement hole 12e formed on the first side wall main body 12c. The second side wall 12b has a second side wall main body 12f.

The first plate member 12d is made of a metal material different from the first side wall main body 12c. Of course, alternatively, they can be made of the same material as the first side wall main body 12c. The first plate member 12d is installed detachably from the outer side of the housing 12 on the first side wall main body 12c. The first plate member 12d is formed here as a round plate, with serrations and flanges for engagement with the first engagement hole 12e formed on their outer peripheral portions. The serrations of the first plate member 12d are engaged with the first engagement hole 12e. The flange of the first plate member 12d contacts with the side surface of the first side wall main body 12c. On the first engagement hole 12e, serration grooves for engaging with the serrations of the first plate member 12d are formed. With this configuration, the first plate member 12d is non-rotatably coupled to the first side wall main body 12c.

The housing 12 has a pair of round shaped first holes 13a and 13b, a pair of second holes 13c and 13d. The first holes 13a and 13b are formed on the first side wall main body 12c and the second side wall main body 12f, respectively. In the illustrated embodiment, first and second bearings 39a and 39b, such as a ball bearing, are arranged in the first holes 13a and 13b, respectively.

The second holes 13c and 13d are formed on the first plate member 12d and the second side wall main body 12f. In the second holes 13c and 13d, the support axle 22 is non-rotatably arranged in the second holes 13c and 13d. In the illustrated embodiment, the first plate member 12d is detachably coupled to the first side wall main body 12c. Of course, alternatively, the first plate member 12d can be pressed in and integrated with the first side wall main body 12c.

In the illustrated embodiment, the housing has a drain opening 12g on a bottom part 12h of the first side wall 12a of the housing 12. Specifically, the drain opening 12g extends through the bottom part 12h of the first side wall 12a such that the drain opening 12g exchanges air between the inside of the housing 12 and the outside of the housing 12. The drain opening 12g also drains fluid therethrough.

The crank axle 14 is a metal axle member made of, for example, iron, stainless steel, or the like. The crank axle 14 is rotatably supported relative to the housing 12 about a rotational axis X1 (e.g., a first rotational axis). Specifically, the crank axle 14 is rotatably supported by the first bearing 39a and the second bearing 39b. The two ends of the crank axle 14 are arranged to protrude out from the first side wall 12a and the second side wall 12b, respectively. On the end portions of the crank axle 14, the crank arms 101 are detachably and non-rotatably coupled to the crank axle 14. In the end portion of the crank axle 14 on the first side wall main body 12c side, the crank axle 14 has a large-diameter flange section 14a for positioning the first rotation transmitting member 16 in the axial direction and a serration section 14b for connecting with the first rotation transmitting member 16. The large-diameter flange section 14a and the serration section 14b are arranged adjacent to each other. The flange section 14a is formed on the entire circumference in the circumferential direction of the crank axle 14. Of course, alternatively, the flange section 14a can be formed intermittently in the circumferential direction and protruding out from the crank axle 14.

The first rotation transmitting member 16 is non-rotatably coupled to the crank axle 14 such that the first rotation transmitting member 16 transmits the rotation of the crank arms 101. The first rotation transmitting member 16 has a first gear 16a made of, for example, a synthetic resin or a metal. The first gear 16a is connected to the serration section 14b of the crank axle 14 such that the first gear 16a and the crank axle 14 rotate together. The first gear 16a is fastened to the crank axle 14 by press-fit, bonding or another appropriate fastening manner. The first gear 16a makes contact with the flange section 14a of the crank axle 14 such that the first gear 16a is positioned in the axial direction of the crank axle 14. The first gear 16a is rotatably supported to the housing 12 via the first bearing 39a. The crank axle 14 is rotatably supported to the housing 12 via the first bearing 39a and the first gear 16a.

The intermediate axle 18 is an axle member made of iron, stainless steel or another metal. The intermediate axle 18 has first and second end portions 18a and 18b. The first end portion 18a is supported on the first side wall main body 12c, while the second end portion 18b is supported on a second case 56b of a motor case 56 of the motor 30. The intermediate axle 18 rotatably supports the second rotation transmitting member 20.

The second rotation transmitting member 20 is a member that transmits the rotation of the first rotation transmitting member 16. The second rotation transmitting member 20 has a second gear 20a that meshes with the first gear 16a, and a first sprocket 20b that rotates together with the second gear 20a. The second rotation transmitting member 20 is a member made of, for example, a synthetic resin or a metal. The second rotation transmitting member 20 is rotatably supported on the intermediate axle 18 via a bearing 40, such as, for example, a needle-shaped roller bearing. The second gear 20a has an engagement section 20c engaged with an inner peripheral portion 20d of the first sprocket 20b. The engagement section 20c is formed on a toothed surface that is not engaged with the first gear 16a among the toothed surface of the second gear 20a. On the inner peripheral portion 20d of the first sprocket 20b, an engagement portion engaged with at least a portion of the second gear 20a is formed. As a result, the second gear 20a and the first sprocket 20b are non-rotatably coupled to each other. Furthermore, retainers are disposed on the second gear 20a for prohibiting an axial movement of the first sprocket 20b in the axial direction of the intermediate axle 18. The retainers are disposed on both sides of the first sprocket 20b in the axial direction of the intermediate axle 18.

The support axle 22 is arranged to support the gear shifting mechanism 32 and the clutch mechanism 38 with respect to the housing 12. The support axle 22 has end portions that extend through the second holes 13c and 13d. The end portions of the support axle 22 are fastened to the first and second side walls 12a and 12b with the nuts 42, respectively. As a result, they are fastened to the first and second side walls 12a and 12b, respectively. The support axle 22 extends through the gear shifting mechanism 32 and the clutch mechanism 38. The support axle 22 rotatably supports the third rotation transmitting member 26.

The third rotation transmitting member 26 is a member that transmits the rotation of the second rotation transmitting member 20. The rotation of the second rotation transmitting member 20 is transmitted by the second chain 24 to the third rotation transmitting member 26. The third rotation transmitting member 26 has a second sprocket 26a engaged with the second chain 24. The second chain 24 is wound on the first sprocket 20b and the second sprocket 26a. The second sprocket 26a is operatively coupled to the gear shifting mechanism 32. In particular, the second sprocket 26a is fixedly coupled to an input part 64 of the gear shifting mechanism 32. Thus, the second sprocket 26a is rotatably supported on the support axle 22 via the input part 64.

As shown in FIG. 2, the motor 30 is an inner rotor-type motor. The motor 30 has the motor case 56, a rotor 58 that is rotatably supported on the motor case 56, and a stator 60 installed on the motor case 56. In the illustrated embodiment, the motor case 56 has a first case 56a integrally formed with the housing 12, and the second case 56b detachably coupled to the first case 56a. The motor case 56 further has an axle supporting recess 56c that supports the second end portion 18b of the intermediate axle 18 on the second case 56b.

The rotor 58 is a cylindrical member that is coaxially arranged relative to the crank axle 14. The crank axle 14 extends through the rotor 58. The rotor 58 has a magnet unit 58a with a plurality of magnetic poles arranged on the outer peripheral portion of the rotor 58 side by side in the circumferential direction. The rotor 58 of the motor 30 has a crank axle receiving hole 58b. The crank axle 14 is rotatably disposed in the crank axle receiving hole 58b of the rotor 58 of the motor 30. The rotor 58 is rotatably supported on the motor case 56 by a pair of bearings 62a and 62b, such as, for example, ball bearings. The bearings 62a and 62b are arranged on the outer peripheral side of the rotor 58. The bearing 62a is installed on the first case 56a, while the bearing 62b is installed on the second case 56b.

The stator 60 is arranged opposite to the rotor 58 on the outer peripheral side of the rotor 58. The stator 60 has a plurality of coils 60a arranged at a certain interval in the circumferential direction. The stator 60 is fixedly coupled to the inner peripheral portion of the first case 56a.

In the illustrated embodiment, the motor 30 is driven by the motor driver circuit 46. Specifically, the motor driver circuit 46 has an inverter (not shown), a controller (not shown) and the like. The inverter is driven by the controller. The controller controls the inverter based on the pedaling force and the speed of the bicycle. The motor driver circuit 46 is a conventionally well-known motor driver circuit. Thus, detailed configurations of the motor driver circuit 46 will be omitted for the sake of brevity.

In the illustrated embodiment, the rotational axes of the motor 30 and the crank axle 14 are coincident with each other. Thus, it is possible to simplify the internal mechanism of the motor 30. As a result, the drive unit 10 can be further simplified. However, of course, it will be apparent to those skilled in the art from this disclosure that the motor 30 and the crank axle 14 can be arranged with respect to each other such that the rotational axes the rotational axes of the motor 30 and the crank axle 14 are offset with respect to each other.

The gear shifting mechanism 32 is arranged on the power transmission passage between the third rotation transmitting member 26 and the torque combining mechanism 36. The gear shifting mechanism 32 has a shifting motor unit 32a and a gear shifting main body 32b. The shifting motor unit 32a rotates an actuating member of the gear shifting main body 32b to a prescribed phase upon receiving a shift operation from a shifter installed on a handle of the bicycle. The shifting motor unit 32a is a conventionally well-known motor unit, such as a motor unit disclosed in, for example, Japanese Patent No. 3529723. However, of course, it will be apparent to those skilled in the art from this disclosure that the shifting motor unit 32a can be replaced with a conventionally well-known mechanism for shifting the power transmission paths of the gear shifting main body 32b, such as a wire operated actuator operated by receiving a manual shift operation from a shifter installed on the handle of the bicycle.

The gear shifting main body 32b is a transmission unit that allows selection from a plurality of (e.g., 8) gear ratios. The configuration of the gear shifting main body 32b is basically identical to a conventionally well-known transmission unit, such as a transmission unit disclosed in U.S. Pat. No. 6,607,465 or U.S. Pat. No. 7,682,283, except for the configurations as described in detail below.

The gear shifting main body 32b of the gear shifting mechanism 32 mainly includes the support axle 22, the input part 64, a planetary gear unit 66, and an output part or hub 68 (e.g., a rotation output member). The rotation of the third rotation transmitting member 26 is transmitted to the input part 64, the planetary gear unit 66 and the output part 68. The input part 64, the planetary gear unit 66 and the output part 68 are rotatably supported on the support axle 22, respectively. Specifically, the input part 64 is rotatably supported on the support axle 22 and operatively coupled to the crank axle 14. The second sprocket 26a of the third rotation transmitting member 26 is fixedly coupled to the input part 64 such that they can rotate together. The planetary gear unit 66 is disposed between the input part 64 and the output part 68. The planetary gear unit 66 selectively establishes a plurality of (e.g., 8) gear ratios. The output part 68 is rotatably supported on the support axle 22 and operatively coupled to the torque combining mechanism 36. The output part 68 outputs the rotation after changing the rotational speed by the planetary gear unit 66 to the torque combining mechanism 36. In the illustrated embodiment, as shown in FIG. 2, the support axle 22 has the center axis that defines a rotational axis X2 (e.g., a second rotational axis) of the input part 64, the planetary gear unit 66 and the output part 68. Specifically, the rotational axis X2 is parallel to the rotational axis X1, and offset relative to the rotational axis X1. Thus, in the illustrated embodiment, the gear shifting mechanism 32 (e.g., the transmission mechanism) includes a plurality of selectable gear ratios. The gear shifting mechanism 32 (e.g., the transmission mechanism) is operatively coupled to the crank axle 14. Furthermore, the gear shifting mechanism 32 (e.g., the transmission mechanism) has the output part 68 (e.g., the rotation output member) that is rotatable relative to the housing 12 about the rotational axis X2 (e.g., the second rotational axis) in response to the rotation of the crank axle 14. The rotational axes X1 and X2 (e.g., the first and second rotational axes) are offset from each other. The rotational axes X1 and X2 (e.g., the first and second rotational axes) are parallel with respect to each other.

The gear shifting mechanism 32 is arranged in the drive unit 10. It is possible to select from a plurality of gear ratios by the gear shifting mechanism 32. Consequently, assisting driving by the motor 30 can be carried out at a high efficiency. Also, even when an internal transmission unit is adopted as the gear shifting mechanism 32, as the force acting on the gear shifting mechanism 32 is small, the transmission operation can be carried out quickly. The gear shifting main body 32b of the gear shifting mechanism 32 is basically identical to a conventionally well-known transmission unit, such as a transmission unit, disclosed in U.S. Pat. No. 6,607,465 or U.S. Pat. No. 7,682,283. Thus, detailed description of the configuration of the gear shifting mechanism 32 will be omitted for the sake of brevity.

The reduction gear unit 34 transmits the rotation of the rotor 58 of the motor 30 to a torque transmitting member 70. The reduction gear unit 34 has one or more gears. In the illustrated embodiment, the reduction gear unit 34 has a first planetary gear mechanism 72 and a second planetary gear mechanism 74. The first planetary gear mechanism 72 has a first sun gear 72a connected to the rotor 58, a plurality of first planetary gears 72b, a first carrier 72c rotatably supporting the first planetary gears 72b, and a first ring gear 72d fixedly coupled to the housing 12. The second planetary gear mechanism 74 has a second sun gear 74a connected to the first carrier 72c, a plurality of second planetary gears 74b, a second carrier 74c rotatably supporting the second planetary gears 74b, and a second ring gear 74d fixedly coupled to the housing 12. The rotational output of the reduction gear unit 34 is transmitted via the torque transmitting member 70 to the torque combining mechanism 36. The torque transmitting member 70 is integrally formed with the second carrier 74c. The torque transmitting member 70 is rotatably supported by a second gear member 78 of the torque combining mechanism 36. The torque transmitting member 70 supports a plurality of clutch pawls 80a of a one-way clutch 80.

The torque combining mechanism 36 transmits the rotating force of the motor 30 and the rotating force of the crank axle 14 to the front sprocket 28. The torque combining mechanism 36 is operatively coupled to the motor 30 and the crank axle 14 to combine the rotational outputs of the motor 30 and the crank axle 14. The torque combining mechanism 36 has a first gear member 76 fixedly coupled to the output part 68 of the gear shifting mechanism 32, a second gear member 78 that meshes with the first gear member 76, and the one-way clutch 80. The torque combining mechanism 36 is operatively connected to the rotor 58 of the motor 30 through the one-way clutch 80 to receive the rotational output of the motor 30.

The second gear member 78 is rotatably supported on the housing 12 via the second bearing 39b on the housing 12. Between the inner peripheral portion of the second gear member 78 and the outer peripheral surface of the crank axle 14, a bearing 82 in the form of, for example, a ball bearing is installed. Consequently, the crank axle 14 is rotatably supported on the housing 12 via the second gear member 78.

The second gear member 78 has a first annular recess 78a in which the one-way clutch 80 is disposed and a second annular recess 78b in which the second bearing 39b is disposed. The second gear member 78 of the torque combining mechanism 36 has a sprocket mounting portion 78c.

The first annular recess 78a is formed in annular shape on the surface of the housing 12 opposite to the second side wall 12b. The outer peripheral portion on the inner side of the first annular recess 78a rotatably supports the torque transmitting member 70. The second annular recess 78b is formed in annular shape on the surface opposite to the second side wall 12b, The inner ring of the second bearing 39b is disposed in the second annular recess 78b. The sprocket mounting portion 78c is configured to be operatively attached to the front sprocket 28 such that the front sprocket 28 rotates about the rotational axis X1 in the forward rotational direction as the crank axle 14 rotates about the rotational axis X1 in the forward rotational direction. The sprocket mounting portion 78c extends in annular shape in the axial direction of the crank axle 14 from the outer peripheral surface on the inner side of the second annular recess 78b. In the second gear member 78, the second annular recess 78b is formed on the radially inner side of the first annular recess 78a. The front sprocket 28 is fixedly coupled to a connecting section 78d on the inner peripheral surface of the sprocket mounting portion 78c. The connecting section 78d can have serrations. The front sprocket 28 is pressed into the connecting section 78d and is fixed by caulking with a plastic deformation, for example. Thus, the second gear member 78 and the front sprocket 28 rotate together.

In the illustrated embodiment, the one-way clutch 80 only transmits the forward rotation of the motor 30 that drives the bicycle in the forward direction to the second gear member 78. On the other hand, the forward rotation of the second gear member 78 relative to the motor 30 is not transmitted to the motor 30. The one-way clutch 80 has a clutch pawl 80a, a clutch tooth 80b, and an inner side member 80c. The clutch pawl 80a is accommodated such that the clutch pawl 80a can pivot along the outer peripheral surface of the inner side member 80c between a release position and an engagement position. The clutch pawl 80a is biased towards the engagement position. The clutch tooth 80b is formed on the inner peripheral surface on the outer side of the first annular recess 78a. The inner side member 80c is formed in annular shape. The torque transmitting member 70 is rotatably supported on the inner peripheral portion of the inner side member 80c.

The front sprocket 28 has an annular section 28b with sprocket teeth 28a formed on the outer peripheral portion, and a cylindrical section 28c integrally formed on the inner peripheral portion of the annular section 28b. The outer peripheral surface of the cylindrical section 28c is pressed into the inner peripheral portion of the second annular recess 78b, and the tip portion of the cylindrical section 28c is fixed by caulking. However, the method for fixing the front sprocket 28 is not limited to the press-fit. The front sprocket 28 can be fixed to the second gear member 78 by any other suitable manner, such as screwing, bonding, fusion welding, etc. The front sprocket 28 rotates about the rotational axis X1 of the crank axle 14. Thus, the rotational axis X1 of the crank axle 14 and the rotational axis of the front sprocket 28 are coincident with each other. However, of course, it will be apparent to those skilled in the art from this disclosure that front sprocket 28 and the crank axle 14 can be arranged with respect to each other such that the rotational axes of the front sprocket 28 and the crank axle 14 are offset with respect to each other.

With this drive unit 10, as shown in FIG. 2, the torque generated by the pedaling force in the forward rotational direction is transmitted in the following transmission passage: the crank arms 101→the crank axle 14→the first rotation transmitting member 16→the second rotation transmitting member 20→the third rotation transmitting member 26→the gear shifting main body 32b→the first gear member 76→the second gear member 78. On the other hand, the output torque of the motor 30 is transmitted in the following path: the reduction gear unit 34→the torque transmitting member 70→the one-way clutch 80→the second gear member 78. The second gear member 78 combines these two torques to transmit them to the front sprocket 28. Thus, the forward rotation of the crank arms 101 is transmitted to the front sprocket 28 after being assisted by the motor 30. In the gear shifting main body 32b, the planetary gear unit 66 transmits the forward, rotation of the crank axle 14 through, a plurality of power transmission paths to rotate the output part 68 about the rotational axis X2 in response to the forward rotation of the crank axle 14.

Figure 3:
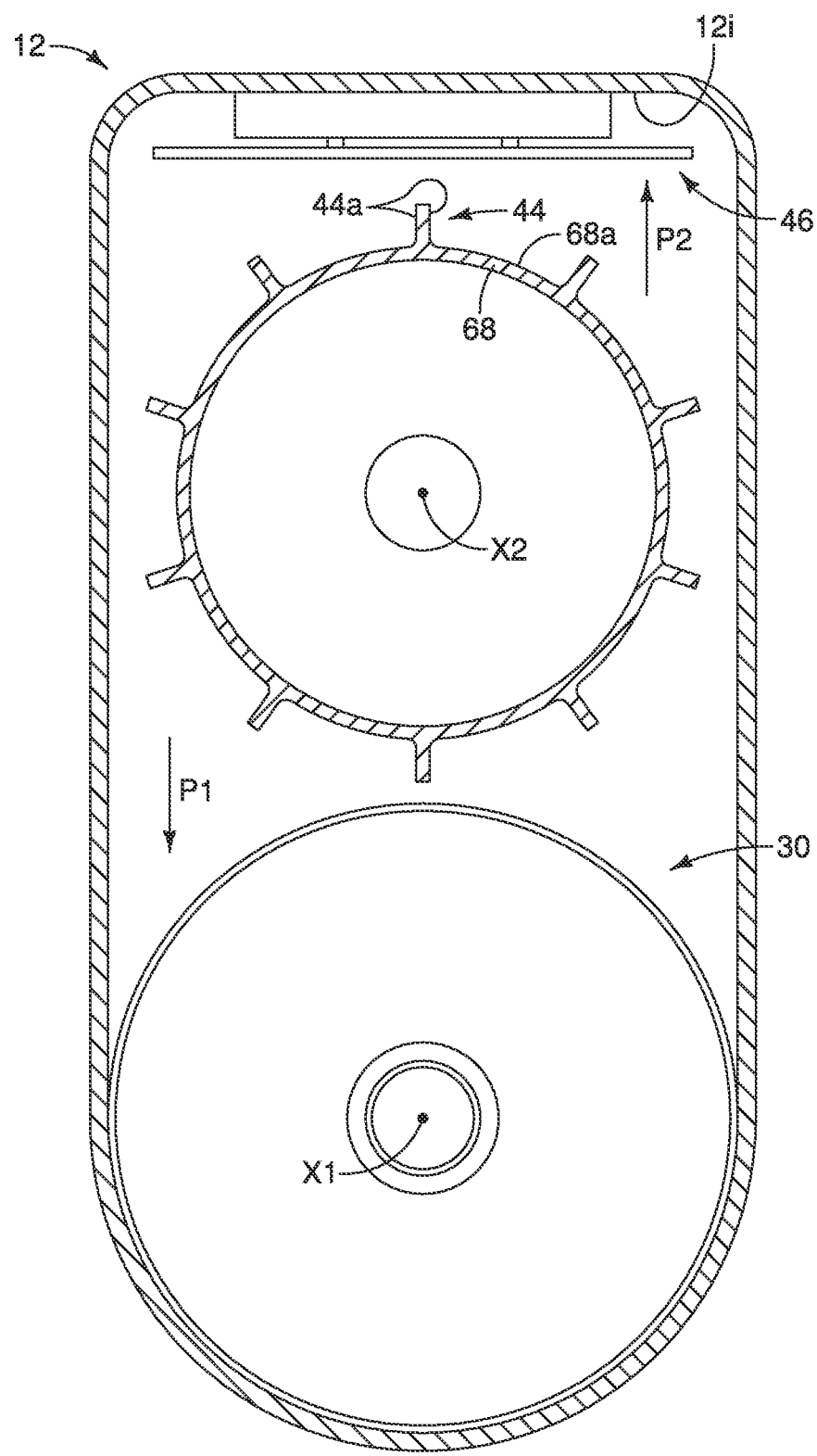
FIG. 3 is a schematic cross-sectional view illustrating the drive unit in accordance with one embodiment, taken along III-III line in FIG. 2.

As shown in FIGS. 2 and 3, the fin members 44 are disposed on an outer periphery 68a of the output part 68. Specifically, in the illustrated embodiment, ten of the fin members 44 are equidistantly and circumferentially arranged along the outer periphery 68a of the output part 68 with respect to the rotational axis X2. Of course, it will be apparent to those skilled in the art from this disclosure that the number of the fin members 44 can be less than or more than ten, as needed and/or desired. In the illustrated embodiment, the fin members 44 are integrally formed with the output part 68 as a one-piece, unitary member. For example, the fin members 44 and the output part 68 are made of a synthetic resin or a metallic material. Thus, the fin members 44 are rotatable together with the output part 68 relative to the housing 12 about the rotational axis X2. Thus, when the output part 68 rotates about the rotational axis X2 in response to the rotation of the crank axle 14, the fin members 44 also rotates or revolve about the rotational axis X2, which generates air flow inside the housing 12. Thus, in the illustrated embodiment, the fin members 44 are rotatably arranged relative to the housing 12 about the rotational axis X2 (e.g., the second rotational axis). Furthermore, the fin members 44 are disposed on the output part 68 (e.g., the rotation output member) such that the fin members 44 integrally rotate with the output part 68 (e.g., the rotation output member) about the rotational axis X2 (e.g., the second rotational axis) in response to the rotation of the crank axle 14. In the illustrated embodiment, the fin members 44 are integrally formed with the output part 68. However, of course, it will be apparent to those skilled in the art from this disclosure that the fin members 44 are independently formed as separate parts from the output part 68. In this case, the fin members 44 are fixedly coupled to the output part 68 with a suitable fastening manner. Furthermore, in this case, the fin members 44 and the output part 68 can be made of different materials, respectively.

In the illustrated embodiment, each of the fin members 44 has a flat elongated plate shape. The fin members 44 are arranged on the outer periphery 68a of the output part 68 such that the fin members 44 extend radially outward from the outer periphery 68a of the output part 68 with respect to the rotational axis X2. Thus, in the illustrated embodiment, the fin members 44 extend radially outward from the outer periphery 68a of the output part 68 (e.g., the rotation output member) in the radial direction with respect to the rotational axis X2 (e.g., the second rotational axis). Specifically, in the illustrated embodiment, each of the fin members 44 has a pair of opposite side faces 44a that faces in opposite circumferential directions about the rotational axis X2, respectively. The opposite side faces 44a have the largest area among faces of the fin members 44, The opposite side faces 44a are longer in a direction along the rotational axis X2 than in a radial direction of the rotational axis X2. Specifically, the fin members 44 extend axially along the outer periphery 68a of the output part 68, respectively. In the illustrated embodiment, the fin members 44 have a flat elongated plate shape. However, of course, the fin members 44 can have a curved cross-sectional shape relative to the radial direction as long as the fin members 44 can generate air flow inside the housing 12 in response to the rotation of the crank axle 14. Also, in the illustrated embodiment, the fin members 44 axially and continuously extend along the outer periphery 68a of the output part 68. However, of course, each of the fin members 44 can be formed by a plurality of portions axially and separately arranged along the outer periphery 68a of the output part 68.

As shown in FIGS. 2 and 3, the motor 30 and the gear shifting mechanism 32 are arranged spaced apart from each other in a direction perpendicular to both of the rotational axes X1 and X2. In particular, the fin members 44 are arranged relative to the motor 30 such that the motor 30 does not interfere with the rotation of the fin members 44. In other words, as shown in FIG. 3, the motor 30 and the fin members 44 are arranged such that an imaginary circle passing through distal ends of the fin members 44 does not touch or cross a part of the motor 30. Thus, in the illustrated embodiment, the fin members 44 are disposed radially outward relative to an outermost portion of the motor 30 in the radial direction with respect to the rotational axis X1 (e.g., the first rotational axis). Furthermore, as shown in FIGS. 2 and 3, the motor 30 and the gear shifting mechanism 32 are arranged directly adjacent to each other. Here, the phrase "directly adjacent to each other" means, for example, that the motor 30 and the gear shifting mechanism 32 are adjacent to each other without having any members therebetween in the direction perpendicular to both of the rotational axes X1 and X2. Thus, if the fin members 44 rotate together with the output part 68 in response to the rotation of the crank axle 14, then the air flow generated from the fin members 44 directly reaches the motor 30 via an unobstructed passageway P1. Thus, in the illustrated embodiment, the fin members 44 are arranged relative to the motor 30 with the unobstructed passageway P1 between the fin members 44 and the motor 30 such that the air flow generated from the fin members 44 directly reaches the motor 30 via the passageway P1. In the illustrated embodiment, the air flow generated from the fin members 44 directly reaches the motor 30. Thus, the motor 30 can be properly cooled by the air flow inside the housing 12.

As shown in FIGS. 2 and 3, the motor driver circuit 46 is fixedly attached to an inner surface 12i of the housing 12 within the housing 12. Specifically, in the illustrated embodiment, the motor driver circuit 46 is fixedly coupled to the housing 12 with screws, adhesive, or any other suitable manner. As mentioned above, the motor driver circuit 46 has the inverter (not shown), the controller (not shown) and the like. The motor driver circuit 46 is electrically coupled to the motor 30 to operate the motor 30. As shown in FIGS. 2 and 3, the motor driver circuit 46 and the gear shifting mechanism 32 are arranged spaced apart from each other. In particular, the fin members 44 are arranged relative to the motor driver circuit 46 such that the motor driver circuit 46 does not interfere with the rotation of the fin members 44. In other words, as shown in FIG. 3, the motor driver circuit 46 and the fin members 44 are arranged such that the imaginary circle passing through distal ends of the fin members 44 does not touch or cross a part of the motor driver circuit 46. Furthermore, as shown in FIGS. 2 and 3, the motor driver circuit 46 and the gear shifting mechanism 32 are arranged directly adjacent to each other. Here, the phrase "directly adjacent to each other" means, for example, that the motor driver circuit 46 and the gear shifting mechanism 32 are adjacent to each other without having any members therebetween. Thus, if the fin members 44 rotate together with the output part 68 in response to the rotation of the crank axle 14, then the air flow generated from the fin members 44 directly reaches the motor driver circuit 46 via an unobstructed passageway P2. Thus, in the illustrated embodiment, the fin members 44 are arranged relative to the motor driver circuit 46 with the unobstructed passageway P2 between the fin member 44 and the motor driver circuit 46 such that the air flow generated from the fin members 44 directly reaches the motor driver circuit 46 via the passageway P2. In the illustrated embodiment, the air flow generated from the fin members 44 directly reaches the motor driver circuit 46. Thus, the motor driver circuit 46 can be properly cooled by the air flow inside the housing 12.

Also, as mentioned above, as shown in FIG. 3, the motor 30, the fin members 44, and the motor driver circuit 46 are arranged such that the imaginary circle passing through distal ends of the fin members 44 does not touch or cross a part of the motor 30 and a part of the motor driver circuit 46. Thus, in the illustrated embodiment, as shown in FIG. 2, the fin members 44 are located between the motor 30 and the motor driver circuit 46 as viewed in a direction perpendicular to the rotational axis X1 (e.g., the first rotational axis) while the fin members 44 rotate. Furthermore, as shown in FIG. 3, the transmission mechanism 32 is disposed between the motor 30 and the motor driver circuit 46 in a direction along a plane (e.g., a paper surface of FIG. 3) that is perpendicular to the rotational axis X2 (e.g., the second rotational axis).

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle drive unit. Accordingly, these directional terms, as utilized to describe the bicycle drive unit should be interpreted relative to a bicycle in an upright riding position on a horizontal surface.

Also if will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only a selected embodiment has been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiment according to the present invention are provided for illustration only, and not for the purpose of limiting the invention as defined by the appended claims and their equivalents.

What is claimed is:

1. A bicycle drive unit comprising:
a housing;
a motor disposed within the housing;
a crank axle rotatably supported relative to the housing about a first rotational axis, axially opposite end portions of the crank axle protruding out from opposite sides of the housing, each of the end portions of the crank axle being configured to detachably and non-rotatably support a crank arm; and
at least one fin member rotatably arranged relative to the housing, the fin member operatively coupled to the crank axle to rotate and to generate an air flow within the housing in response to rotation of the crank axle.

2. The bicycle drive unit according to claim 1, further comprising
a transmission mechanism including a plurality of selectable gear ratios, the transmission mechanism being disposed within the housing, the transmission mechanism being operatively coupled to the crank axle.

3. The bicycle drive unit according to claim 2, wherein
the transmission mechanism has a rotation output member that is rotatable relative to the housing about a second rotational axis in response to the rotation of the crank axle.

4. The bicycle drive unit according to claim 3, wherein
the fin member is disposed on the rotation output member such that the fin member integrally rotates with the rotation output member about the second rotational axis in response to the rotation of the crank axle.

5. The bicycle drive unit according to claim 3, wherein
the fin member extends radially outward from an outer periphery of the rotation output member in a radial direction with respect to the second rotational axis.

6. The bicycle drive unit according to claim 3, wherein
the first and second rotational axes are offset from each other.

7. The bicycle drive unit according to claim 1, wherein
the fin member is arranged relative to the motor with an unobstructed passageway between the fin member and the motor such that the air flow generated from the fin member directly reaches the motor via the passageway.

8. The bicycle drive unit according to claim 1, further comprising
a motor driver circuit fixedly attached to an inner surface of the housing within the housing.

9. The bicycle drive unit according to claim 8, wherein
the fin member is arranged relative to the motor driver circuit with an unobstructed passageway between the fin member and the motor driver circuit such that the air flow generated from the fin member directly reaches the motor driver circuit via the passageway.

10. The bicycle drive unit according to claim 8, wherein
the fin member is located between the motor and the motor driver circuit as viewed in a direction perpendicular to the first rotational axis while the fin member rotates.

11. The bicycle drive unit according to claim 8, further comprising
a transmission mechanism having a rotation output member that is rotatable relative to the housing about a second rotational axis in response to the rotation of the crank axle, with the transmission mechanism being disposed between the motor and the motor driver circuit in a direction along a plane that is perpendicular to the second rotational axis.

12. The bicycle drive unit according to claim 1, wherein
the housing has a drain opening on a bottom part of the housing.

13. The bicycle drive unit according to claim 1, wherein
the crank axle is rotatably disposed in a crank axle receiving hole of the motor.

14. A bicycle drive unit comprising:
a housing;
a motor disposed within the housing;
a crank axle rotatably supported relative to the housing about a first rotational axis;
at least one fin member rotatably arranged relative to the housing about a second rotational axis different from the first rotational axis, the fin member being operatively coupled to the crank axle to rotate and to generate an air flow within the housing in response to rotation of the crank axle; and
a transmission mechanism including a plurality of selectable gear ratios, the transmission mechanism being disposed within the housing, the transmission mechanism being operatively coupled to the crank axle, the transmission mechanism having a rotation output member that is rotatable relative to the housing about the second rotational axis in response to the rotation of the crank axle.

15. A bicycle drive unit comprising:
a housing;
a motor disposed within the housing;
a crank axle rotatably supported relative to the housing about a first rotational axis; and
at least one fin member rotatably arranged relative to the housing, the fin member operatively coupled to the crank axle to rotate and to generate an air flow within the housing in response to rotation of the crank axle, the fin member being disposed radially outward relative to an outermost portion of the motor in a radial direction with respect to the first rotational axis.

16. A bicycle drive unit comprising:
a housing;
a motor disposed within the housing;
a crank axle rotatably supported relative to the housing about a first rotational axis;

at least one fin member rotatably arranged relative to the housing, the fin member operatively coupled to the crank axle to rotate and to generate an air flow within the housing in response to rotation of the crank axle; and a transmission mechanism including a plurality of selectable gear ratios, the transmission mechanism being disposed within the housing, the transmission mechanism being operatively coupled to the crank axle, the transmission mechanism having a rotation output member that is rotatable relative to the housing about a second rotational axis in response to the rotation of the crank axle, the first and second rotational axes being parallel with respect to each other.

* * * * *